United States Patent
Yoshioka et al.

(10) Patent No.: US 12,390,756 B2
(45) Date of Patent: Aug. 19, 2025

(54) HONEYCOMB FILTER

(71) Applicant: NGK Insulators, Ltd., Nagoya (JP)

(72) Inventors: Fumihiko Yoshioka, Nagoya (JP);
Sachiko Ishida, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 876 days.

(21) Appl. No.: 17/645,466

(22) Filed: Dec. 22, 2021

(65) Prior Publication Data

US 2022/0305422 A1 Sep. 29, 2022

(30) Foreign Application Priority Data

Mar. 29, 2021 (JP) .................................. 2021-055958

(51) Int. Cl.
*B01D 46/24* (2006.01)
*B01D 53/94* (2006.01)
(Continued)

(52) U.S. Cl.
CPC . *B01D 46/24492* (2021.08); *B01D 46/24491* (2021.08); *B01D 46/2482* (2021.08); *B01D 46/2484* (2021.08); *B01D 53/94* (2013.01); *B01J 21/04* (2013.01); *B01J 23/44* (2013.01); *B01J 35/31* (2024.01); *B01J 35/56* (2024.01); *B01J 35/657* (2024.01); *B01D 2255/1023* (2013.01); *B01D 2255/2065* (2013.01); *B01D 2255/20715* (2013.01);
(Continued)

(58) Field of Classification Search
None
See application file for complete search history.

(56) References Cited

U.S. PATENT DOCUMENTS

| 5,709,722 A | 1/1998 | Nagai et al. |
| 2012/0244042 A1* | 9/2012 | Mizutani .......... B01D 46/24491 422/180 |

FOREIGN PATENT DOCUMENTS

| DE | 10 2014 013 893 A1 | 4/2015 |
| EP | 0 747 579 A2 | 12/1996 |

(Continued)

OTHER PUBLICATIONS

German Office Action (Application No. 10 2022 200 176.1) dated May 31, 2022 (with English translation).

(Continued)

*Primary Examiner* — Jelitza M Perez
(74) *Attorney, Agent, or Firm* — BURR PATENT LAW, PLLC

(57) ABSTRACT

A honeycomb filter includes a honeycomb structure having a porous partition wall disposed to surround a plurality of cells; and a plugging portion provided at one end of the cell, wherein the honeycomb structure has an inflow side region including a range of up to at least 30% with respect to the total length of the honeycomb structure with the inflow end face as the starting point and an outflow side region including a range of up to at least 20% with respect to the total length of the honeycomb structure with the outflow end face as the starting point, in the extending direction of the cell of the honeycomb structure, an average pore diameter of the partition wall in the inflow side region is 15 to 20 μm and an average pore diameter of the partition wall in the outflow side region is 9 to 14 μm.

7 Claims, 4 Drawing Sheets

(51) Int. Cl.
    *B01J 21/04*         (2006.01)
    *B01J 23/44*         (2006.01)
    *B01J 35/31*         (2024.01)
    *B01J 35/56*         (2024.01)
    *B01J 35/64*         (2024.01)
    *F01N 3/28*          (2006.01)

(52) U.S. Cl.
CPC ................ *B01D 2255/2092* (2013.01); *B01D 2255/9155* (2013.01); *B01D 2279/30* (2013.01); *F01N 3/2803* (2013.01); *F01N 2330/30* (2013.01); *F01N 2370/02* (2013.01)

(56) References Cited

FOREIGN PATENT DOCUMENTS

| | | |
|---|---|---|
| JP | 2009-022029 A | 1/2009 |
| JP | 2012-196656 A | 10/2012 |
| JP | 2015-066536 A | 4/2015 |

OTHER PUBLICATIONS

Japanese Office Action (Application No. 2021-055958) dated May 21, 2024 (with English translation) (6 pages).

\* cited by examiner

HONEYCOMB FILTER

The present application is an application based on JP 2021-055958 filed on Mar. 29, 2021 with Japan Patent Office, the entire contents of which are incorporated herein by reference.

BACKGROUND OF THE INVENTION

Field of the Invention

The present invention relates to a honeycomb filter. More particularly, the present invention relates to a honeycomb filter having excellent trapping performance for trapping particulate matter contained in exhaust gas and excellent purification performance for purifying harmful components contained in exhaust gas.

Description of the Related Art

In recent years, regulations for removing particulate matter contained in exhaust gas emitted from gasoline engines have become stricter worldwide, and a honeycomb filter having a honeycomb structure has been used as a filter for removing the particulate matter. Hereinafter, the particulate matter may be referred to as "PM". PM is an abbreviation for "Particulate Matter".

For example, the honeycomb filter may include a honeycomb structure having a porous partition wall defining a plurality of cells, and a plugging portion for plugging either end of the cell. Such a honeycomb filter has a structure in which the porous partition wall serves as a filter for removing PM. Specifically, the exhaust gas containing PM is flowed in from an inflow end face of the honeycomb filter and is filtered by trapping the PM with a porous partition wall. The purified exhaust gas is then discharged from an outflow end face of the honeycomb filter. In this way, PM in exhaust gas can be removed.

To improve purification performance of such a honeycomb filter, it has been carried out to load a catalyst for purifying exhaust gas in a porous partition wall (see, for example, Patent Document 1). As the catalyst for purifying exhaust gas, for example, a platinum group element-containing catalyst constituted by a catalyst for purifying exhaust gas containing a platinum group element can be mentioned. Hereinafter, the platinum group element-containing catalyst may be referred to as a "PGM catalyst". "PGM" is an abbreviation for "Platinum Group Metal". PGM includes ruthenium, rhodium, palladium, osmium, iridium, and platinum.

[Patent Document 1] JP-A-2015-066536

SUMMARY OF THE INVENTION

In recent years, a honeycomb filter loading the above-mentioned catalyst for purifying exhaust gas (hereinafter, simply referred to as "catalyst") in a porous partition wall has been required to further improve exhaust gas purification performance. As such measures, for example, loading more catalysts in porous partition wall has been studied, but loading more catalysts in the partition wall has been problematic in that trapping performance of the honeycomb filter is deteriorated and pressure loss of the honeycomb filter is increased.

The present invention has been made in view of the problems with the prior arts described above. The present invention provides a honeycomb filter having excellent trapping performance for trapping PM contained in exhaust gas and excellent purification performance for purifying harmful components contained in exhaust gas.

According to the present invention, a honeycomb filter described below is provided.

[1] A honeycomb filter including: a honeycomb structure having a porous partition wall disposed so as to surround a plurality of cells serving as a fluid through channel extending from an inflow end face to an outflow end face; and a plugging portion provided so as to plug end at any one of the inflow end face side or the outflow end face side of the cell, wherein the cells having the plugging portion at ends on the outflow end face side and that are open on the inflow end face side are inflow cells, the cells having the plugging portion at ends on the inflow end face side and that are open on the outflow end face side are outflow cells, the honeycomb structure has an inflow side region including a range of up to at least 30% with respect to the total length of the honeycomb structure with the inflow end face of the honeycomb structure as the starting point and an outflow side region including a range of up to at least 20% with respect to the total length of the honeycomb structure with the outflow end face of the honeycomb structure as the starting point, in the extending direction of the cell of the honeycomb structure, an average pore diameter of the partition wall in the inflow side region is 15 to 20 μm and an average pore diameter of the partition wall in the outflow side region is 9 to 14 μm.

[2] The honeycomb filter according to [1], wherein a porosity of the partition wall is 50 to 65% and a thickness of the partition wall is 0.19 to 0.31 mm.

[3] The honeycomb filter according to [1] or [2], wherein a cell density of the honeycomb structure is 30 to 50 cells/cm$^2$.

[4] The honeycomb filter according to any one of [1] to [3], further includes a catalyst for purifying exhaust gas loaded on the partition wall constituting the honeycomb structure, wherein the catalyst for purifying exhaust gas is loaded inside a pore formed at least in the partition wall, in the inflow side region of the honeycomb structure, and is loaded at least on the surface of the partition wall, in the outflow side region of the honeycomb structure.

[5] The honeycomb filter according to [4], wherein the catalyst for purifying exhaust gas includes a platinum group element-containing catalyst.

[6] The honeycomb filter according to [5], wherein the platinum group element-containing catalyst includes an oxide of at least one element of aluminum, zirconium, and cerium.

[7] The honeycomb filter according to any one of [4] to [6], wherein a loading amount of the catalyst for purifying exhaust gas per unit volume of the honeycomb structure is 50 g/L or more.

The honeycomb filter of the present invention has effects of having excellent trapping performance for trapping PM contained in exhaust gas and also having excellent purification performance for purifying harmful components contained in exhaust gas when using a porous partition wall loaded with a catalyst for purifying exhaust gas. Further, the honeycomb filter of the present invention can effectively suppress an increase in pressure loss when using a porous partition wall loaded with a catalyst for purifying exhaust gas and trapping PM with the partition wall.

That is, the honeycomb filter of the present invention has an inflow side region with an average pore diameter of 15 to 20 μm in a range of at least 30% of the total length of the honeycomb structure with the inflow end face of the honeycomb structure as the starting point, in the extending direction of the cell of the honeycomb structure. Therefore, when using a porous partition wall loaded with a catalyst for purifying exhaust gas, in the inflow side region described above, a catalyst for purifying exhaust gas is preferentially loaded inside a pore formed on the partition wall. Hereinafter, the "pore formed on the partition wall" is also simply referred to as "pore in the partition wall". On the other hand, the honeycomb filter of the present invention has an outflow side region with an average pore diameter of 9 to 14 μm in a range of at least 20% of the total length of the honeycomb structure with the outflow end face of the honeycomb structure as the starting point, in the extending direction of the cell of the honeycomb structure. In such the outflow side region, a catalyst for purifying exhaust gas is preferentially loaded on the surface of the partition wall, and a catalyst layer on which a catalyst for purifying exhaust gas is deposited is formed on the surface of the partition wall. When such the catalyst layer is formed preferentially in the outflow side region with a lot of exhaust gas flow, the contact between the exhaust gas and the catalyst increases in this outflow side region, and exhaust gas purification performance can be improved. In addition, the catalyst layer formed in the outflow side region can effectively trap PM in exhaust gas, and trapping performance for trapping PM can also be improved. Further, in the outflow side region, since PM is trapped on the surface of the catalyst layer, the pore in the partition wall is hardly blocked by the PM, it is possible to extremely effectively suppress the increase in pressure loss at the time of trapping PM.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

Figure 1:
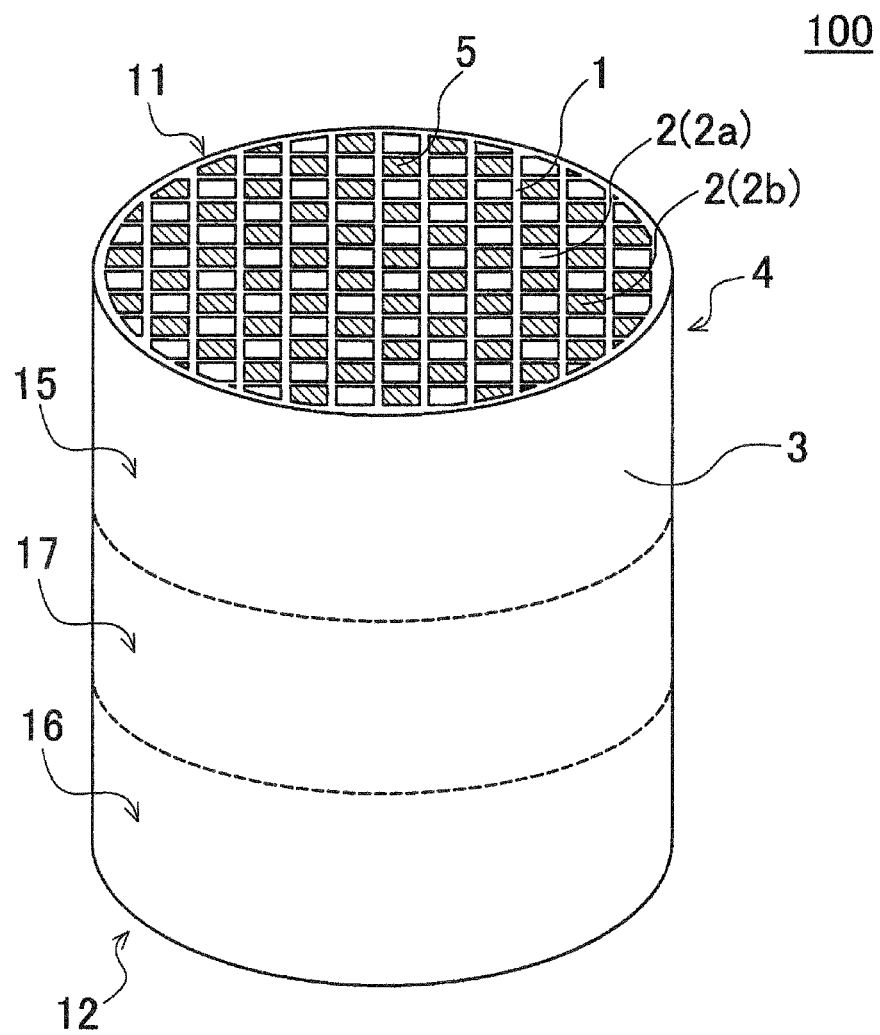
FIG. 1 is a perspective view schematically showing a first embodiment of the honeycomb filter of the present invention.
Figure 2:
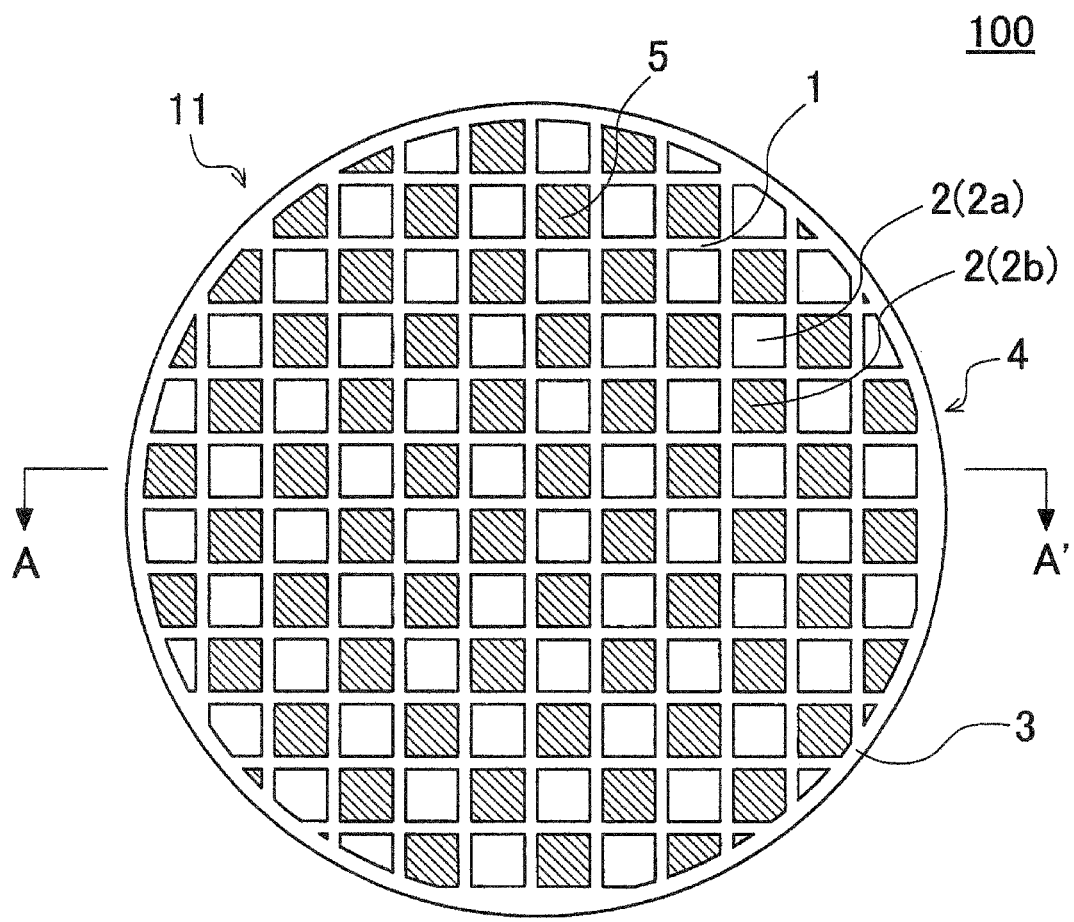
FIG. 2 is a plan view of the inflow end face side of the honeycomb filter shown in FIG. 1.
Figure 3:
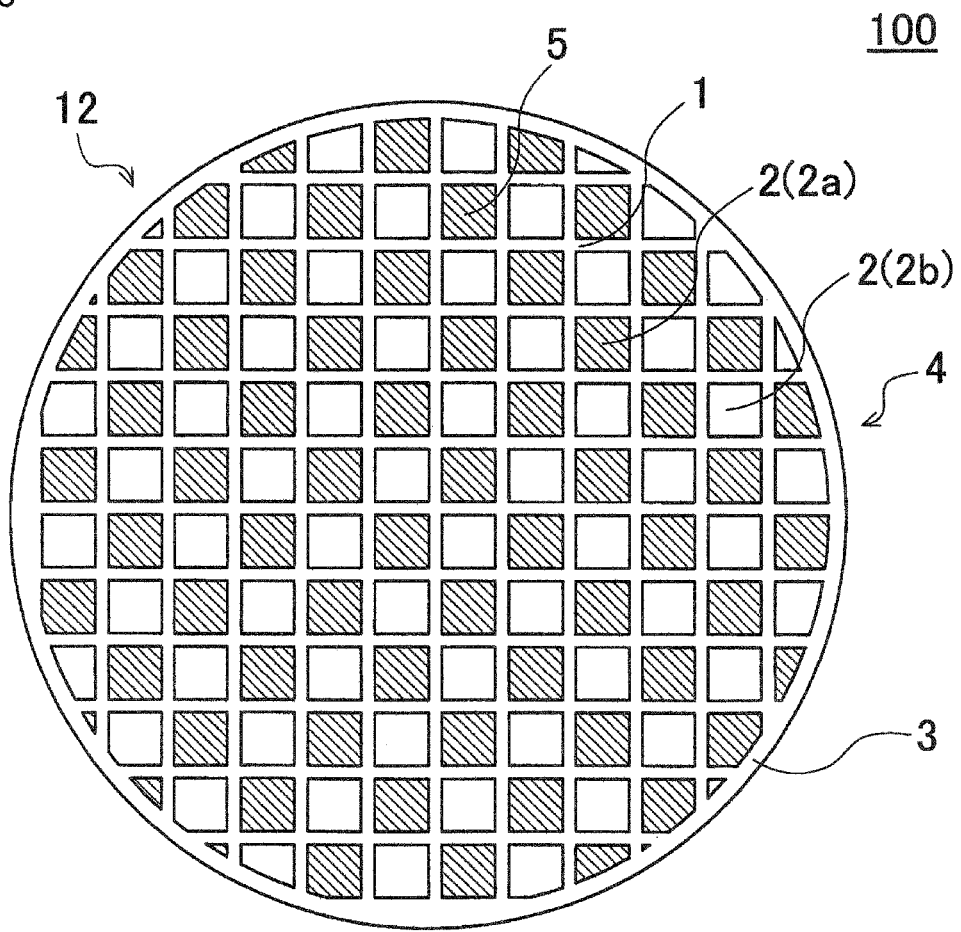
FIG. 3 is a plan view of the outflow end face side of the honeycomb filter shown in FIG. 1.
Figure 4:
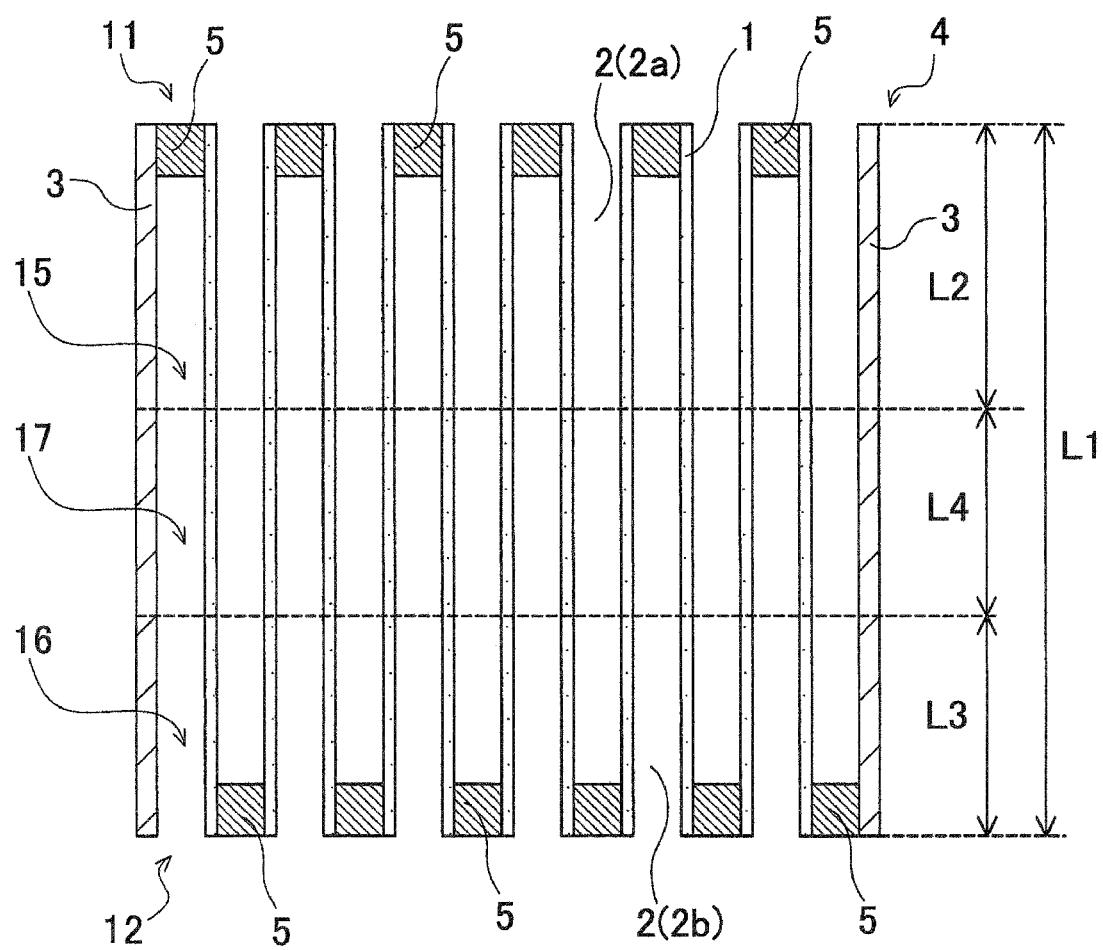
FIG. 4 is a sectional view schematically showing a section taken along the line A-A' of FIG. 2.

(1) Honeycomb Filter:

A first embodiment of the honeycomb filter of the present invention is the honeycomb filter 100 as shown in FIGS. 1 to 4. FIG. 1 is a perspective view schematically showing the first embodiment of the honeycomb filter of the present invention. FIG. 2 is a plan view of an inflow end face side of the honeycomb filter shown in FIG. 1. FIG. 3 is a plan view of an outflow end face side of the honeycomb filter shown in FIG. 1. FIG. 4 is a sectional view schematically showing the section taken along the line A-A' of FIG. 2.

As shown in FIGS. 1 to 4, the honeycomb filter 100 of the present embodiment is provided with a honeycomb structure 4 and a plugging portion 5. The honeycomb structure 4 has a porous partition wall 1 disposed so as to surround a plurality of cells 2 serving as a fluid through channel extending from the inflow end face 11 to the outflow end face 12. The honeycomb structure 4 shown in FIGS. 1 to 4 is configured in a round-pillar shape with the inflow end face 11 and the outflow end face 12 as both end faces, and further has a circumferential wall 3 on the outer peripheral side surface thereof. In other words, the circumferential wall 3 is disposed to encompass the partition wall 1 disposed in a grid pattern.

The plugging portion 5 is provided so as to plug end at any one of the inflow end face 11 side or the outflow end face 12 side of the cell 2. Hereinafter, among the plurality of cells 2, the cell 2 in which the plugging portion 5 is disposed at the end on the outflow end face 12 side and the inflow end face 11 side is opened is referred to as the "inflow cell 2a". In addition, among the plurality of cells 2, the cell 2 in which the plugging portion 5 is disposed at the end on the inflow end face 11 side and the outflow end face 12 side is opened is referred to as the "outflow cell 2b". In the honeycomb filter 100 of the present embodiment, it is preferable that the inflow cells 2a and the outflow cells 2b are alternately arranged with the partition wall 1 interposed therebetween.

The honeycomb filter 100 is characterized in that the honeycomb structure 4 is configured as follows. The honeycomb structure 4 has an inflow side region 15 including a range of up to at least 30% with respect to the total length L1 of the honeycomb structure 4 with the inflow end face 11 of the honeycomb structure 4 as the starting point, in the extending direction of the cell 2 of the honeycomb structure 4. In addition, the honeycomb structure 4 has an outflow side region 16 including a range of up to at least 20% with respect to the total length L1 of the honeycomb structure 4 with the outflow end face 12 of the honeycomb structure 4 as the starting point, in the extending direction of the cell 2 of honeycomb structure 4. That is, in the honeycomb structure 4, the length L2 of the inflow side region 15 in the extending direction of the cell 2 is at least 30% with respect to the total length L1 of the honeycomb structure 4, and the length L3 of the outflow side region 16 in the extending direction of the cell 2 is at least 20% with respect to the total length L1 of the honeycomb structure 4, as shown in FIG. 4.

Hereinafter, the ratio (%) of the length of the inflow side region 15 with respect to the total length L1 of the honeycomb structure 4 with the inflow end face 11 of the honeycomb structure 4 as the starting point may be referred to as a "length range (%) from the inflow end face 11 of the inflow side region 15". In addition, the ratio (%) of the length of the outflow side region 16 with respect to the total length L1 of the honeycomb structure 4 with the outflow end face 12 of the honeycomb structure 4 as the starting point may be referred to as a "length range (%) of the outflow side region 16 from the outflow end face 12".

In the honeycomb filter 100 of the present embodiment, an average pore diameter of the partition wall 1 in the inflow side region 15 is 15 to 20 μm and an average pore diameter of the partition wall 1 in the outflow side region 16 is 9 to 14 μm. That is, in the honeycomb filter 100, the average pore diameter of the partition wall 1 is relatively large in the inflow side region 15 of the honeycomb structure 4, while the average pore diameter of the partition wall 1 is relatively small in the outflow side region 16 of the honeycomb structure 4. The average pore diameters of the partition wall 1 in the inflow side region 15 and the outflow side region 16 of the honeycomb structure 4 are measured by the mercury press-in method. The average pore diameter of the partition wall 1 can be measured by using, for example, Autopore 9500 (trade name) manufactured by Micromeritics.

The honeycomb filter 100 is excellent in trapping performance for trapping PM contained in exhaust gas and also excellent in purification performance for purifying harmful components contained in exhaust gas, when using a porous partition wall 1 loaded with a catalyst for purifying exhaust gas. Further, the honeycomb filter 100 can effectively suppress an increase in pressure loss when using the porous partition wall 1 loaded with the catalyst for purifying exhaust gas.

In other words, in the honeycomb filter 100, the catalyst for purifying exhaust gas is preferentially loaded inside the pores in the partition wall 1 in the inflow side region 15 in which the average pore diameter of the partition wall 1 is 15 to 20 µm, when using the porous partition wall 1 loaded with the catalyst for purifying exhaust gas. On the other hand, the catalyst for purifying exhaust gas is preferentially loaded on the surface of partition wall 1 in outflow side region 16 in which the average pore diameter of the partition wall 1 is 9 to 14 µm, and a catalyst layer in which the catalyst for purifying exhaust gas is deposited is formed on the surface of the partition wall 1. When such the catalyst layer is formed preferentially in the outflow side region 16 with a lot of exhaust gas flow, the contact between the exhaust gas and the catalyst increases in the outflow side region 16, and exhaust gas purification performance can be improved. In addition, the catalyst layer formed in the outflow side region 16 can effectively trap PM in exhaust gas, and the trapping performance for trapping PM can also be improved. Further, in the outflow side region 16, since PM is trapped on the surface of the catalyst layer described above, the pore in the partition wall 1 is hardly blocked by the PM, it is possible to extremely effectively suppress the increase in pressure loss at the time of trapping PM.

The confirmation method of the inflow side region 15 and the outflow side region 16 of the honeycomb structure 4 and the measuring method of the average pore diameters of the partition wall 1 in the inflow side region 15 and the outflow side region 16 are as follows. First, 5 measuring points are determined in 1% increments with respect to the total length L1 of the honeycomb structure 4 with the inflow end face 11 as the starting point. Then, a part of the partition wall 1 of the honeycomb structure 4 is cut out from each of the measurement points described above, and a sample piece for measurement for measuring the average pore diameter is obtained, respectively. As the sample piece for measurement, for example, a rectangular parallelepiped having a length, a width, and a height of approximately 10 mm, approximately 10 mm, and approximately 10 mm, respectively, is used. Then, each average pore diameter (i.e., an average pore diameter in 1% increments with respect to the total length L1 of the honeycomb structure 4 with the inflow end face 11 as the starting point) is measured for each sample piece for measurement by the mercury press-in method.

In measuring the average pore diameter described above, a range in which the average pore diameter of the partition wall 1 with the inflow end face 11 as the starting point is 15 to 20 µm is the "inflow side region 15". Further, a ratio of the length of the range in which the average pore diameter of the partition wall 1 with respect to the total length L1 of the honeycomb structure 4 with the inflow end face 11 as the starting point is 15 to 20 µm (i.e., inflow side region 15) is the "length range (%) from the inflow end face 11 of the inflow side region 15".

Similarly, in measuring the average pore diameter described above, a range in which the average pore diameter of the partition wall 1 with the outflow end face 12 as the starting point is 9 to 14 µm is the "outflow side region 16". Further, a ratio of the length of the range in which the average pore diameter of the partition wall 1 with respect to the total length L1 of the honeycomb structure 4 with the outflow end face 12 as the starting point is 9 to 14 µm (i.e., outflow side region 16) is the "length range (%) from the outflow end face 12 of the outflow side region 16".

In the honeycomb filter 100 of the present embodiment, the inflow side region 15 is in the range of up to at least 30% with respect to the total length L1 of the honeycomb structure 4 with the inflow end face 11 as the starting point. On the other hand, the outflow side region 16 is in the range of up to at least 20% with respect to the total length L1 of the honeycomb structure 4 with the outflow end face 12 as the starting point. Therefore, the honeycomb structure 4 may further have an "intermediate region 17" other than inflow side region 15 and outflow side region 16 in a part of the range of 30 to 80% in the total length L1 direction of the honeycomb structure 4 with the inflow end face 11 as the starting point in the extending direction of the cell 2 of honeycomb structure 4. The intermediate region 17 is a region which does not satisfy the respective numerical ranges of the average pore diameters of the partition wall 1 in the inflow side region 15 and the outflow side region 16 and is not included in any of the regions. It is needless to say that the honeycomb structure 4 does not have the intermediate region 17 as described above, and the predetermined length range with the inflow end face 11 as the starting point may be the inflow side region 15, and the remaining length range may be the outflow side region 16.

In the intermediate region 17 of the honeycomb structure 4, the average pore diameter of the partition wall 1 in the intermediate region 17 is preferably greater than 14 µm and less than 15 µm. For example, when the average pore diameter of the honeycomb structure 4 is 15 to 20 µm in the range of 50% and is 14 to 15 µm in the range of 50 to 70%, with respect to the total length L1 of the honeycomb structure 4 with the inflow end face 11 as the starting point, the range of the 50% described above is the inflow side region 15 and the range of 50 to 70% is the intermediate region 17. Then, for example, when the average pore diameter in the remaining range of 70 to 100% with respect to the total length L1 of the honeycomb structure 4 with the inflow end face 11 as the starting point is 9 to 14 µm, this remaining range (range of 70 to 100%) is the outflow side region 16.

As shown in FIG. 4, in the honeycomb structure 4, the length L2 in the extending direction of the cell 2 in the inflow side region 15 is at least 30% with respect to the total length L1 of the honeycomb structure 4 and is at most 80% with respect to the total length L1 of the honeycomb structure 4. The length L2 in the extending direction of the cell 2 in the inflow side region 15 is not particularly limited, but is preferably, for example, 30 to 60%, more preferably 30 to 50%, with respect to the total length L1 of the honeycomb structure 4.

In the honeycomb structure 4, the length L3 in the extending direction of the cell 2 in the outflow side region 16 is at least 20% with respect to the total length L1 of the honeycomb structure 4, and is at most 70% with respect to the total length L1 of the honeycomb structure 4. The length L3 in the extending direction of the cell 2 in the outflow side region 16 is not particularly limited, but is preferably, for example, 20 to 40%, more preferably 20 to 30%, with respect to the total length L1 of the honeycomb structure 4.

In honeycomb structure 4, the intermediate region 17 is an optional component as described above, and the length L4 in the extending direction of the cell 2 in the intermediate region 17 is at most 50% with respect to the total length L1 of the honeycomb structure 4. The length L4 in the extending direction of the cell 2 in the intermediate region 17 can be appropriately set in accordance with the length L2 in the extending direction of the cell 2 in the inflow side region 15 and the length L3 in the extending direction of the cell 2 in the outflow side region 16 described above.

The average pore diameter of the partition wall 1 in the inflow side region 15 is 15 to 20 μm, preferably 16 to 20 μm, and more preferably 17 to 20 μm. The average pore diameter of the partition wall 1 in the outflow side region 16 is 9 to 14 μm, preferably 9 to 13 μm, and more preferably 9 to 12 μm.

A porosity of the partition wall 1 of the honeycomb structure 4 is preferably 50 to 65%, more preferably 53 to 65%, and particularly preferably 55 to 65%. The porosity of the partition wall 1 is measured by the mercury press-in method. The porosity of the partition wall 1 can be measured by using, for example, Autopore 9500 (trade name) manufactured by Micromeritics. If the porosity of the partition wall 1 is less than 50%, it is not preferable in that the permeability resistance of the partition wall increases and pressure loss increases. If the porosity of the partition wall 1 exceeds 65%, it is not preferable in that the strength is remarkably deteriorated.

The honeycomb structure 4 preferably has a thickness of the partition wall 1 of 0.19 to 0.31 mm, more preferably 0.22 to 0.31 mm, and particularly preferably 0.22 to 0.28 mm. The thickness of the partition wall 1 can be measured with a scanning electron microscope or a microscope, for example. If the thickness of the partition wall 1 is less than 0.19 mm, adequate strength may not be obtained in some cases. On the other hand, if the thickness of partition wall 1 exceeds 0.31 mm, pressure loss may increase when the catalyst is loaded on the partition wall 1.

A shape of the cells 2 formed in the honeycomb structure 4 is not particularly limited. For example, the shape of the cells 2 in the section orthogonal to the extending direction of the cells 2 may be polygonal, circular, elliptical or the like. Examples of the polygonal shape include a triangle, a quadrangle, a pentagon, a hexagon, and an octagon. The shape of the cells 2 is preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be combined. Further, regarding the sizes of the cells 2, all the cells 2 may have the same size or different sizes. For example, although not shown, some of the plurality of cells may be larger, and other cells may be smaller relatively. In the present invention, the cell means a space surrounded by the partition wall.

The cell density of the cell 2 defined by the partition wall 1 is preferably 30 to 50 cells/cm$^2$, more preferably 35 to 50 cells/cm$^2$. With this configuration, it is possible to suitably use as a filter for trapping PM in exhaust gas emitted from engines of automobiles or the like.

The circumferential wall 3 of the honeycomb structure 4 may be integrally formed with the partition wall 1, or may be a circumferential coating layer formed by applying a circumferential coating material so as to encompass the partition wall 1. Although not shown, during the manufacturing, the partition wall and the circumferential wall are integrally formed and then the formed circumferential wall may be removed by a well-known method such as grinding. Then, the circumference coating layer may be provided on the circumferential side of the partition wall.

A shape of the honeycomb structure 4 is not particularly limited. The shape of the honeycomb structure 4 includes pillar-shaped in which the shapes of the inflow end face 11 and the outflow end face 12 are circular, elliptical, polygonal, or the like.

A size of the honeycomb structure 4, for example, the length in the extending direction of the cell 2 of the honeycomb structure 4 (hereinafter, also referred to as "total length L1") and the size of the section orthogonal to the extending direction of the cell 2 of the honeycomb structure 4 (hereinafter, also referred to as "sectional area") is not particularly limited. Each size may be selected as appropriate such that optimum purification performance is obtained during use of the honeycomb filter 100. The total length L1 of the honeycomb structure 4 is preferably 90 to 160 mm, more preferably 120 to 140 mm. In addition, the sectional area of the honeycomb structure 4 is preferably 8000 to 16000 mm$^2$, more preferably 10000 to 14000 mm$^2$.

The material of the partition wall 1 preferably contains at least one selected from the group consisting of cordierite, silicon carbide, silicon-silicon carbide composite material, mullite, alumina, aluminum titanate, silicon nitride, and silicon carbide-cordierite composite material. The material constituting the partition wall 1 preferably contains the materials listed in the above group in an amount of 30% by mass or more, more preferably 40% by mass or more, and particularly preferably 50% by mass or more. In the honeycomb filter 100 of the present embodiment, the material constituting the partition wall 1 is particularly preferably cordierite.

The honeycomb structure 4 is preferably an integrally formed product made of the materials constituting the partition wall 1 described above. That is, it is preferable that the honeycomb structure 4 in the honeycomb filter 100 is not produced by connecting the inflow side region 15 and the outflow side region 16 which are produced separately, but is an integrally formed product that is integrally formed by using predetermined forming materials.

The honeycomb filter 100 may further include a catalyst for purifying exhaust gas (not shown) loaded on the partition wall 1 constituting the honeycomb structure 4. The catalyst for purifying exhaust gas is preferably loaded inside a pore formed at least in the partition wall 1 in inflow side region 15 of the honeycomb structure 4. Here, "loaded inside a pore in the partition wall 1" means that the catalyst for purifying exhaust gas is present at least somewhere between 0.1T (where T indicates the thickness of the partition wall 1) and 0.9T from the surface of the partition wall 1 on the inflow cell 2a side in the thickness direction of the partition wall 1. In addition, "loaded inside a pore formed at least in the partition wall 1" means that the catalyst for purifying exhaust gas may be loaded only inside the pore of the partition wall 1, or may be loaded on the surface and inside the pore of the partition wall 1. On the other hand, it is preferable that the catalyst for purifying exhaust gas is loaded at least on the surface of the partition wall 1 in the outflow side region 16 of the honeycomb structure 4. "Loaded at least on the surface of the partition wall 1" means that the catalyst for purifying exhaust gas may be loaded only on the surface of the partition wall 1, or may be loaded on the surface and inside the pore of the partition wall 1.

"Loaded only on the surface of the partition wall 1" means that the catalyst is present on the surface of the partition wall 1, and that no catalyst for purifying exhaust gas is present between 0.1T (where T indicates the thickness of the partition wall 1) and 1.0T from the surface of the partition wall 1 on the inflow cell 2a side in the thickness direction of the partition wall 1. "Loaded on the surface and inside the pore of the partition wall 1" means that the catalyst is present on the surface of the partition wall 1, and that the catalyst for purifying exhaust gas is present at least somewhere between 0.1T (where T indicates the thickness of the partition wall 1) and 0.9T from the surface of the partition wall 1 on the inflow cell 2a side in the thickness direction of the partition wall 1. With this configuration, a catalyst layer in which the catalyst for purifying exhaust gas is deposited on the surface of the partition wall 1 is formed in the outflow side region 16. When such a catalyst layer is formed preferentially in the outflow side region 16 with a lot of exhaust gas flow, the contact between the exhaust gas and the catalyst increases in the outflow side region 16, and exhaust gas purification performance can be effectively improved. In addition, the catalyst layer formed in the outflow side region 16 can effectively trap PM in exhaust gas, and can improve trapping performance for trapping PM. Further, in the outflow side region, since PM is trapped on the surface of the catalyst layer described above, the pore in the partition wall is hardly blocked by the PM, it is possible to extremely effectively suppress the increase in pressure loss at the time of trapping PM.

In the honeycomb filter 100 further comprising a catalyst for purifying exhaust gas, as described above, it is preferable to differ loading form of the catalyst in the inflow side region 15 and the outflow side region 16 having different sizes of the average pore diameter. Since the honeycomb filter 100 differs in the average pore diameter of the partition wall 1 in two regions of the inflow side region 15 and the outflow side region 16, for example, one type of a slurry for catalyst loading (e.g., a catalyst liquid) can be used to change loading than of the catalyst with respect to each region. In particular, loading form of the catalyst for the desired region can be conveniently changed by one catalyst loading step. Therefore, according to the honeycomb filter 100 of the present embodiment, the honeycomb filter 100 further comprising a catalyst for purifying exhaust gas as described above is possible to extremely conveniently manufactured.

Note that, in the inflow side region 15, as described above, a part of the catalyst may be loaded on the surface of the partition wall 1 as long as the catalyst is loaded at least inside a pore formed on the partition wall 1. Similarly, in the outflow side region 16, as described above, a part of the catalyst may be loaded inside a pore formed on the partition wall 1 as long as the catalyst is loaded at least on the surface of partition wall 1. However, when loading forms of the catalysts in each region of the inflow side region 15 and the outflow side region 16 are compared, it is preferable that relatively more catalysts are loaded inside pores formed on the partition wall 1 in the inflow side region 15. On the other hand, it is preferable that relatively more catalyst is loaded on the surface of the partition wall 1 in the outflow side region 16.

It is preferable that the catalyst for purifying exhaust gas which is loaded in the partition wall 1 constituting the honeycomb structure 4 contains a platinum group element-containing catalyst. The platinum group element-containing catalyst is a catalyst for purifying exhaust gas containing a platinum group element. The platinum group elements are ruthenium, rhodium, palladium, osmium, iridium, and platinum. Hereinafter, the platinum group element may be referred to as "PGM". Since the catalyst for purifying exhaust gas contains a platinum group element-containing catalyst, the effect of excellent purification performance for purifying harmful components contained in exhaust gas is exhibited. In the honeycomb filter 100 of the present embodiment, it is preferable that the catalyst for purifying exhaust gas loaded on the partition wall 1 is substantially a platinum group element-containing catalyst.

The platinum group element-containing catalyst preferably contains an oxide of at least one element of aluminum, zirconium, and cerium. The catalyst containing such an oxide preferably contains 1 to 3% by mass of a platinum group element based on the total mass of the catalyst. The composition of the platinum group element-containing catalyst can be measured, for example, by X-ray Fluorescence (XRF) analysis. Specifically, the composition analysis of the platinum group element-containing catalyst is performed by detecting the fluorescent X-ray inherent in each element, which is generated by irradiating the sample with X-rays.

The loading amount of the catalyst for purifying exhaust gas per unit volume of the honeycomb structure 4 is not particularly limited, but is preferably, for example, 50 g/L or more, more preferably 50 to 100 g/L, and particularly preferably 70 to 100 g/L. Note that the loading amount of the catalyst for purifying exhaust gas is the mass (g) of the catalyst loaded per 1 L of the volume of the honeycomb structure 4. The loading method of the catalyst for purifying exhaust gas includes a method in which the honeycomb structure 4 is wash-coated with a catalyst liquid containing a catalyst component, and then heat-treated at a high temperature and baked, for example.

(2) Manufacturing Method of Honeycomb Filter:

A manufacturing method of the honeycomb filter of the present invention is not particularly limited, and the honeycomb filter can be manufactured by the following method, for example.

First, a plastic kneaded material for producing a partition wall of the honeycomb structure is prepared. The kneaded material for producing the partition wall of the honeycomb structure can be prepared by adding, as appropriate, an additive such as a binder, pore former, and water to a raw material powder for producing suitable materials of the partition wall described above. As the raw material powder, for example, a powder of alumina, talc, kaolin, or silica can be used. Examples of the binder include methylcellulose and hydroxypropyl methylcellulose. Examples of the additives include surfactant.

Next, the kneaded material thus obtained is extruded, thereby producing a pillar-shaped honeycomb formed body having a partition wall defining a plurality of cells and a circumferential wall disposed so as to surround the partition wall. Next, the obtained honeycomb formed body is dried by microwaves and hot air, for example.

Next, a plugging portion is formed on the dried honeycomb formed body. The plugging portion can be formed according to a conventionally known manufacturing method of honeycomb filter. For example, first, the inflow end face of the honeycomb formed body is provided with a mask so that the inflow cell is covered. Thereafter, the end of the honeycomb formed body provided with the mask is immersed in the plugging slurry, and the plugging slurry is filled into the open end of the unmasked outflow cell. Thereafter, for the outflow end face of the honeycomb formed body, the plugging slurry is filled into the open end of the inflow cell in the same manner as described above.

Thereafter, the honeycomb formed body with the plugging portion is further dried in a hot air dryer.

The honeycomb formed body with the plugging portion is then fired to manufacture a honeycomb filter provided with a honeycomb structure and a plugging portion disposed so as to plug either end of the cell. The firing temperature and the firing atmosphere for firing the honeycomb formed body differ depending on the raw material from which the honeycomb formed body is made, and a skill in art can select the firing temperature and the firing atmosphere that are optimal for the selected materials.

When manufacturing the honeycomb filter of the present invention, the average pore diameter of the partition wall of the obtained honeycomb structure is adjusted by the following process. That is, the average pore diameter of the partition wall in the inflow side region of the obtained honeycomb structure is adjusted to 15 to 20 μm, and the average pore diameter of the partition wall in the outflow side region is adjusted to 9 to 14 μm. Specifically, when manufacturing the honeycomb filter by firing the honeycomb formed body, the difference between the temperature in the filter of the inflow end face side and the temperature in the filter of the outflow end face side is adjusted to 10° C. or higher. Thus, the average pore diameter of the partition wall constituting the honeycomb filter can be adjusted by providing the difference above a predetermined temperature inside the honeycomb formed body at the inflow end face side and the outflow end face side during firing.

EXAMPLES

The following will describe the present invention more specifically by way of examples, but the present invention is not at all limited by the examples.

Example 1

First, raw materials of alumina, talc, kaolin, and silica for producing a partition wall of the honeycomb structure were prepared. To the prepared raw materials of alumina, talc, kaolin, and silica, 2 parts by mass of dispersing medium and 7 parts by mass of an organic binder were added, respectively, and mixed and kneaded to prepare a kneaded material. As the dispersing medium, water was used. As the organic binder, methylcellulose was used. As dispersing agent, surfactant was used.

Next, the kneaded material was extruded using a die for manufacturing a honeycomb formed body to obtain the honeycomb formed body having a round pillar shape as the overall shape. The cells of the honeycomb formed body had a quadrangular shape.

Next, the honeycomb formed body was dried by a microwave dryer and dried completely by a hot-air drier, and then both end faces of the honeycomb formed body were cut so as to have predetermined dimensions.

Next, a plugging portion was formed on the dried honeycomb formed body. Specifically, first, the inflow end face of the honeycomb formed body was provided with a mask so that the inflow cell was covered. Thereafter, the end of the honeycomb formed body provided with the mask was immersed in the plugging slurry, and the plugging slurry was filled into the open end of the unmasked outflow cell. Thereafter, for the outflow end face of the honeycomb formed body, the plugging slurry was filled into the open end of the inflow cell in the same manner as described above. Thereafter, the honeycomb formed body with the plugging portion was further dried in a hot air dryer.

Next, the dried honeycomb formed body was degreased and fired to produce a honeycomb filter of Example 1. In Example 1, the average pore diameter of the partition wall constituting the honeycomb filter was adjusted by adjusting the temperature distribution in the firing process.

Next, the partition wall of the honeycomb filter of Example 1 was loaded with a platinum group element-containing catalyst by the following method. First, a slurry for forming a catalyst layer containing a powder of an aluminum oxide obtained by loading palladium as a platinum group element, ion-exchanged water, and dispersing agent was prepared. Next, the slurry for forming a catalyst layer was poured from the inflow end face of the honeycomb filter, and the poured slurry for forming a catalyst layer was sucked from the outflow end face at an appropriate suction amount so that the platinum group element-containing catalyst layer was applied to the partition wall. Thereafter, the platinum group element-containing catalyst applied to the partition wall was fired at 500° C., and the platinum group element-containing catalyst was loaded on the partition wall of the honeycomb filter of Example 1. In Example 1, the platinum group element-containing catalyst was loaded by the above method so that the loading amount of the platinum group element-containing catalyst per unit volume of the honeycomb structure was 70 g/L. The loading amount of the platinum group element-containing catalyst is shown in the column of "Catalyst loading amount (g/L)" in Table 1.

The honeycomb filter of Example 1 had a round-pillar shape, where the inflow end face and the outflow end face were round. The length of the honeycomb filter in the extending direction of the cell was 127 mm. The diameter of end face of the honeycomb filter was 118 mm. In the honeycomb structure constituting the honeycomb filter, the thickness of the partition wall was 0.305 mm and the cell density was 38.8 cells/cm'. The porosity of the partition wall of the honeycomb structure was 61%. The cell density, partition wall thickness and porosity are shown in Table 1.

Further, the honeycomb filter of Example 1 had the average pore diameter of the partition wall of 19 μm in the range up to 40% with respect to the total length of the honeycomb structure with the inflow end face of the honeycomb structure as the starting point. Therefore, in the honeycomb filter of Example 1, the range of up to 40% with respect to the total length of the honeycomb structure with the inflow end face of the honeycomb structure as the starting point was the inflow side region in which the average pore diameter of the partition wall was 15 to 20 μm. Further, the honeycomb filter of Example 1 had the average pore diameter of partition wall of 14 μm in the range of up to 20% with respect to the total length of the honeycomb structure with the outflow end face of the honeycomb structure as the starting point. For this reason, in the honeycomb filter of Example 1, the range of up to 20% with respect to the total length of honeycomb structure with the outflow end face of the honeycomb structure as the starting point was the outflow side region in which the average pore diameter of the partition wall was 9 to 14 μm. The results are shown in the columns "Average pore diameter (μm)" and "Length range from inflow end face (%)" of "Inflow side region", and "Average pore diameter (μm)" and "Length range from outflow end face (%)" of "Outflow side region" in Table 1.

TABLE 1

| | Cell density (cells/cm$^2$) | Partition wall thickness (mm) | Porosity (%) | Catalyst loading amount (g/L) | Inflow side region | | Outflow side region | |
|---|---|---|---|---|---|---|---|---|
| | | | | | Average pore diameter(μm) | Length range from inflow end face (%) | Average pore diameter (μm) | Length range from outflow end face (%) |
| Comparative Example 1 | 38.8 | 0.305 | 61 | 70 | 19 | — | 19 | — |
| Comparative Example 2 | 38.8 | 0.305 | 61 | 70 | 19 | 30 | 16 | 20 |
| Comparative Example 3 | 38.8 | 0.305 | 61 | 70 | 19 | 30 | 14 | 5 |
| Comparative Example 4 | 38.8 | 0.305 | 61 | 70 | 14 | 50 | 13 | 20 |
| Comparative Example 5 | 38.8 | 0.305 | 61 | 70 | 19 | 20 | 14 | 20 |
| Example 1 | 38.8 | 0.305 | 61 | 70 | 19 | 40 | 14 | 20 |
| Example 2 | 38.8 | 0.241 | 60 | 65 | 18 | 50 | 14 | 30 |
| Example 3 | 31.0 | 0.190 | 55 | 100 | 17 | 35 | 12 | 20 |
| Example 4 | 42.6 | 0.216 | 57 | 60 | 15 | 60 | 9 | 20 |
| Example 5 | 46.5 | 0.254 | 63 | 80 | 16 | 40 | 11 | 20 |
| Example 6 | 46.5 | 0.241 | 65 | 100 | 20 | 30 | 9 | 30 |
| Example 7 | 37.2 | 0.190 | 59 | 55 | 18 | 40 | 9 | 30 |
| Example 8 | 49.6 | 0.279 | 57 | 80 | 20 | 50 | 13 | 20 |
| Example 9 | 49.6 | 0.254 | 56 | 90 | 20 | 50 | 10 | 30 |
| Example 10 | 46.5 | 0.279 | 64 | 85 | 20 | 50 | 9 | 20 |
| Example 11 | 46.5 | 0.305 | 57 | 95 | 20 | 50 | 10 | 25 |

For the honeycomb filter of Example 1, "Filtration efficiency performance", "Pressure loss performance with soot", and "Exhaust gas purification performance" was evaluated in the following manner. Table 2 shows the result.
(Filtration Efficiency Performance)

First, exhaust gas purification devices were fabricated by using the honeycomb filters of each Example and Comparative example as the exhaust gas purifying filters. The fabricated exhaust gas purification device connected to an outlet side of an engine exhaust manifold of a 1.2 L direct injection type gasoline engine vehicle, and the number of soot particles contained in the gas emitted from the outlet port of the exhaust gas purification device was measured by a PN measurement method. "PN Measurement Method" is the measurement method proposed by the Particle Measurement Program (PMP) by the Working Party on Pollution and Energy (GRPE) of the World Forum for Harmonization of Vehicle Regulations (WP29) of the Economic Commission for Europe (ECE) of the United Nations (UN). More specifically, in the determination of the number of soot particles, the cumulative total number of soot particles emitted after WLTC (Worldwide harmonized Light duty Test Cycle) mode-running was used as the number of soot particles in the exhaust gas purification device to be determined, and filtration efficiency was measured. With respect to the filtration efficiency measured as described above, the value (%) of filtration efficiency of the exhaust gas purification device using the honeycomb filters of each Example and Comparative example, when the value of filtration efficiency of the exhaust gas purification device using the honeycomb filter of Comparative example 1 was set to 100%, was obtained. The filtration efficiencies were evaluated based on the following evaluation criteria.

Evaluation "Excellent": When the value of filtration efficiency of the exhaust gas purification device using the honeycomb filter of Comparative example 1 was set to 100%, and the value of filtration efficiency of the exhaust gas purification device using the honeycomb filter to be evaluated is 120% or more, the evaluation is regarded as "Excellent".

Evaluation "Good": When the value of filtration efficiency of the exhaust gas purification device using the honeycomb filter of Comparative example 1 was set to 100%, and the value of filtration efficiency of the exhaust gas purification device using the honeycomb filter to be evaluated is 110% or more and less than 120%, the evaluation is regarded as "Good".

Evaluation "Available": When the value of filtration efficiency of the exhaust gas purification device using the honeycomb filter of Comparative example 1 was set to 100%, and the value of filtration efficiency of the exhaust gas purification device using the honeycomb filter to be evaluated is 100% or more and less than 110%, the evaluation is regarded as "Available".

Evaluation "Fail": When the value of filtration efficiency of the exhaust gas purification device using the honeycomb filter of Comparative example 1 was set to 100%, and the value of filtration efficiency of the exhaust gas purification device using the honeycomb filter to be evaluated is less than 100%, the evaluation is regarded as "Fail".
(Pressure Loss Performance with Soot)

Exhaust gas emitted from 1.2 L direct injection type gasoline engine was allowed to flow into the honeycomb filters of each Example and Comparative example, the soot in exhaust gas was trapped at the partition wall of the honeycomb filter. Trapping of soot was carried out until the deposition amount of the soot particles per unit volume (1 L) of the honeycomb filter was 1 g/L. Then, exhaust gas of the engine at 200° C. was allowed to flow in at a flow rate of 1.0 Nm$^3$/min with the deposition amount of the soot particles being 1 g/L, and the pressures on the inflow end face side and the outflow end face side of the honeycomb filter were measured. Then, the pressure loss (kPa) of each honeycomb filter was determined by calculating the pressure difference between the inflow end face side and the outflow end face side. With respect to the pressure loss measured as described above, the value (%) of pressure loss of the exhaust gas purification device using the honeycomb filters of each Example and Comparative Example, when the value of pressure loss of the exhaust gas purification device using the honeycomb filter of Comparative Example 1 was set to 100%, was obtained. The pressure loss performance with soot was evaluated based on the following evaluation criteria.

Evaluation "Excellent": When the value of pressure loss of the honeycomb filter of Comparative Example 1 is set to 100%, and the value of pressure loss of the honeycomb filter to be evaluated is 80% or less, the evaluation is regarded as "Excellent".

Evaluation "Good": When the value of pressure loss of the honeycomb filter of Comparative Example 1 is set to 100%, and the value of pressure loss of the honeycomb filter to be evaluated exceeds 80% and is 90% or less, the evaluation is regarded as "Good".

Evaluation "Acceptable": When the value of pressure loss of the honeycomb filter of Comparative Example 1 is set to 100%, and the value of pressure loss of the honeycomb filter to be evaluated exceeds 90% and is 100% or less, the evaluation is regarded as "Acceptable".

Evaluation "Fail": When the value of pressure loss of the honeycomb filter of Comparative Example 1 is set to 100%, and the value of pressure loss of the honeycomb filter to be evaluated exceeds 100%, the evaluation is regarded as "Fail".

(Exhaust Gas Purification Performance)

First, exhaust gas purification devices were fabricated by using the honeycomb filters of each Example and Comparative example as the exhaust gas purifying filters. The fabricated exhaust gas purification device connected to an outlet side of an engine exhaust manifold of a 1.2 L direct injection type gasoline engine vehicle, and the concentration of NOx contained in the gas emitted from the outlet port of the exhaust gas purification device was measured and purification ratio of NOx was determined. With respect to the purification ratio of NOx measured as described above, the value (%) of the purification ratio of NOx of the exhaust gas purification device using the honeycomb filters of each Example and Comparative Example, when the value of the purification ratio of NOx of the exhaust gas purification device using the honeycomb filter of Comparative Example 1 was set to 100%, was obtained. The exhaust gas purification performances were evaluated based on the following evaluation criteria.

Evaluation "Excellent": When the value of purification ratio of NOx of the exhaust gas purification device using the honeycomb filter of Comparative Example 1 is set to 100%, and the value of purification ratio of NOx of the exhaust gas purification device using the honeycomb filter to be evaluated exceeds 120%, the evaluation is regarded as "Excellent".

Evaluation "Good": When the value of purification ratio of NOx of the exhaust gas purification device using the honeycomb filter of Comparative Example 1 is set to 100%, and the value of purification ratio of NOx of the exhaust gas purification device using the honeycomb filter to be evaluated exceeds 110% and is 120% or less, the evaluation is regarded as "Good".

Evaluation "Acceptable": When the value of purification ratio of NOx of the exhaust gas purification device using the honeycomb filter of Comparative Example 1 is set to 100%, and the value of purification ratio of NOx of the exhaust gas purification device using the honeycomb filter to be evaluated exceeds 100% and is 110% or less, the evaluation is regarded as "Acceptable".

Evaluation "Fail": When the value of purification ratio of NOx of the exhaust gas purification device using the honeycomb filter of Comparative Example 1 is set to 100%, and the value of purification ratio of NOx of the exhaust gas purification device using the honeycomb filter to be evaluated is 100% or less, the evaluation is regarded as "Fail".

TABLE 2

|  | Filtration efficiency performance | Pressure loss performance with soot | Exhaust gas purification performance |
|---|---|---|---|
| Comparative Example 1 | Criteria | Criteria | Criteria |
| Comparative Example 2 | Good | Fail | Acceptable |
| Comparative Example 3 | Good | Available | Fail |
| Comparative Example 4 | Good | Fail | Excellent |
| Comparative Example 5 | Good | Fail | Good |
| Example 1 | Good | Acceptable | Acceptable |
| Example 2 | Acceptable | Acceptable | Acceptable |
| Example 3 | Acceptable | Acceptable | Excellent |
| Example 4 | Acceptable | Good | Acceptable |
| Example 5 | Good | Excellent | Good |
| Example 6 | Excellent | Excellent | Excellent |
| Example 7 | Acceptable | Excellent | Acceptable |
| Example 8 | Good | Good | Good |
| Example 9 | Good | Excellent | Excellent |
| Example 10 | Excellent | Excellent | Excellent |
| Example 11 | Excellent | Good | Excellent |

Examples 2 to 11

The honeycomb filters were manufactured in the same manner as in Example 1, except that the cell density, the thickness and the porosity of the partition wall, and the configuration of the inflow side region and the outflow side region were changed as shown in Table 1. In the configuration of the inflow side region and the outflow side region in Examples 2 to 11, the average pore diameter of the partition wall (μm) and the length range from the respective end face (%) was adjusted by making the difference between the temperature in the filter of the inflow end face side and the temperature in the filter of the outflow end face side 10° C. or higher when firing the honeycomb formed body. Then, the platinum group element-containing catalyst was loaded to the honeycomb filters of Example 2 to 11 in the same manner as in Example 1 so as to have the loading amounts shown in the column of "Catalyst loading amount (g/L)" in Table 1.

Comparative Examples 1 to 5

The honeycomb filters were manufactured in the same manner as in Example 1, except that the cell density, the thickness and the porosity of the partition wall, and the configuration of the inflow side region and the outflow side region were changed as shown in Table 1. In the configuration of the inflow side region and the outflow side region in Comparative Examples 2 to 5, the average pore diameter of the partition wall (μm) and the length range from the respective end face (%) was adjusted by adjusting the temperature distribution in the firing process. Further, in Comparative Example 1, the average pore diameter of the partition wall was set to 19 μm in any range in the extending direction of the cell of the honeycomb structure body by making the difference between the temperature in the filter of the inflow end face side and the temperature in the filter of the outflow end face side less than 10° C. when firing the honeycomb formed body. Then, the platinum group element-containing catalyst was loaded to the honeycomb filters of Comparative Examples 1 to 5 in the same manner as in Example 1 so as to have the loading amounts shown in the column of "Catalyst loading amount (g/L)" in Table 1.

The honeycomb filters of Examples 2 to 11 and Comparative Examples 1 to 5 were evaluated for "Filtration efficiency performance", "Pressure loss performance with soot", and "Exhaust gas purification performance" in the same manner as in Example 1. Table 2 shows the result.
(Results)

The honeycomb filters of Examples 1 to 11 were confirmed to be superior to each performance of the honeycomb filter of Comparative Example 1 serving as a reference, in all evaluation of "Filtration efficiency performance", "Pressure loss performance with soot", and "Exhaust gas purification performance". Therefore, it was found that the honeycomb filters of Examples 1 to 11 have excellent trapping performance, also excellent purification performance, and can suppress an increase in pressure loss with soot when trapping soot with the partition wall as compared with the conventional honeycomb filter. On the other hand, the honeycomb filters of Comparative Examples 2, 4, and 5 were inferior to the honeycomb filter of Comparative Example 1 in pressure loss with soot when trapping soot with the partition wall. The honeycomb filter of Comparative Example 3 was inferior in exhaust gas purification performance as compared to the honeycomb filter of Comparative Example 1. Further, the honeycomb filter of Comparative Example 2 was not found a large improvement for exhaust gas purification performance.

INDUSTRIAL APPLICABILITY

The honeycomb filter of the present invention can be used as a filter for trapping particulate matter in exhaust gas.

DESCRIPTION OF REFERENCE NUMERALS

1: partition wall, 2: cell, 2a: inflow cell, 2b: outflow cell, 3: circumferential wall, 4: honeycomb structure, 5: plugging portion, 11: inflow end face, 12: outflow end face, 15: inflow side region, 16: outflow side region, 17: intermediate region, 100: honeycomb filter.

What is claimed is:

1. A honeycomb filter comprising: a honeycomb structure having a porous partition wall disposed so as to surround a plurality of cells serving as a fluid through channel extending from an inflow end face to an outflow end face; and a plugging portion provided so as to plug end at any one of the inflow end face side or the outflow end face side of the cell, wherein the cells having the plugging portion at ends on the outflow end face side and that are open on the inflow end face side are inflow cells, the cells having the plugging portion at ends on the inflow end face side and that are open on the outflow end face side are outflow cells, the honeycomb structure has an inflow side region that is at least 30% with respect to the total length of the honeycomb structure with the inflow end face of the honeycomb structure as the starting point and an outflow side region that is at least 20% with respect to the total length of the honeycomb structure with the outflow end face of the honeycomb structure as the starting point, in the extending direction of the cell of the honeycomb structure, the honeycomb structure has an intermediate region between the inflow side region and the outflow side region in the extending direction of the cell, an average pore diameter of the partition wall in the inflow side region is 15 to 20 μm and an average pore diameter of the partition wall in the outflow side region is 9 to 14 μm, and an average pore diameter of the partition wall in the intermediate region has a range that is neither in the range of 15 to 20 μm of average pore diameter of the partition wall in the inflow side region, nor in the range of 9 to 14 μm of the average pore diameter of the partition wall in the outflow side region.

2. The honeycomb filter according to claim 1, wherein a porosity of the partition wall is 50 to 65% and a thickness of the partition wall is 0.19 to 0.31 mm.

3. The honeycomb filter according to claim 1, wherein a cell density of the honeycomb structure is 30 to 50 cells/cm$^2$.

4. The honeycomb filter according to claim 1, further comprises a catalyst for purifying exhaust gas loaded with the partition wall constituting the honeycomb structure, wherein the catalyst for purifying exhaust gas is loaded inside a pore formed at least in the partition wall, in the inflow side region of the honeycomb structure, and is loaded at least on the surface of the partition wall, in the outflow side region of the honeycomb structure.

5. The honeycomb filter according to claim 4, wherein the catalyst for purifying exhaust gas includes a platinum group element-containing catalyst.

6. The honeycomb filter according to claim 5, wherein the platinum group element-containing catalyst includes an oxide of at least one element of aluminum, zirconium, and cerium.

7. The honeycomb filter according to claim 4, wherein a loading amount of the catalyst for purifying exhaust gas per unit volume of the honeycomb structure is 50 g/L or more.

* * * * *